(12) United States Patent
Das Gupta et al.

(10) Patent No.: US 11,323,514 B2
(45) Date of Patent: May 3, 2022

(54) DATA TIERING FOR EDGE COMPUTERS, HUBS AND CENTRAL SYSTEMS

(71) Applicant: EMC IP Holding Company LLC, Hopkinton, MA (US)

(72) Inventors: Arunava Das Gupta, Bangalore (IN); Niladri Bhattacharya, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 335 days.

(21) Appl. No.: 16/398,892

(22) Filed: Apr. 30, 2019

(65) Prior Publication Data

US 2020/0351344 A1    Nov. 5, 2020

(51) Int. Cl.
*H04L 29/08* (2006.01)
*H04L 12/24* (2006.01)
*H04L 67/1097* (2022.01)
*H04L 67/5682* (2022.01)
*H04L 41/16* (2022.01)

(52) U.S. Cl.
CPC .......... *H04L 67/1097* (2013.01); *H04L 41/16* (2013.01); *H04L 67/2852* (2013.01)

(58) Field of Classification Search
CPC ..... H04L 67/1097; H04L 41/16; H04L 29/08; H04L 12/24; H04N 67/285; H04N 67/2852
USPC ............................................ 70/243; 709/243
See application file for complete search history.

(56) References Cited

U.S. PATENT DOCUMENTS

| | | | |
|---|---|---|---|
| 7,664,819 B2* | 2/2010 | Murphy | .............. H04L 51/12 709/206 |
| 2016/0100027 A1* | 4/2016 | Haghighi | ............ H04L 67/1097 709/214 |

* cited by examiner

*Primary Examiner* — Sibte H Bukhari
(74) *Attorney, Agent, or Firm* — Workman Nydegger

(57) ABSTRACT

Systems and methods for tiering data in distributed data networks. A global model is developed based on federated learning where edge servers are able to train a model. The learning from the edge servers are collectively applied to the global model. This process can be repeated until the global model is ready for deployment. The global model allows data to be tiered. This may include pushing data from a datacenter to edge servers or cleaning edge servers of data that does not satisfy the global model. The model can be retrained and can be used to proactively push new content out to the edge servers.

20 Claims, 4 Drawing Sheets

DATA TIERING FOR EDGE COMPUTERS, HUBS AND CENTRAL SYSTEMS

FIELD OF THE INVENTION

Embodiments of the invention relate to systems, methods, and apparatus for tiering data. More particularly, embodiments of the invention relate to systems and methods for tiering data for edge computers and edge computing systems. More particularly, embodiments of the invention relate to systems and methods for optimizing data tiering for edge computers, hubs, and central systems using federated machine learning.

BACKGROUND

Computing devices and systems today are operating at seemingly ever-increasing speeds. Data is being generated and consumed in greater quantities. One attempt to facilitate the need to both access and upload data is often referred to as edge computing. This type of arrangement is often found in distributed environments such as telecommunication data networks.

Generally, edge computing is an attempt to bring computing power, memory and data close to where it is needed—in the edge computing systems. Currently, it is not possible to keep all of the data being accessed by end users on the edge servers or edge computing systems (e.g., on the towers serving the telecommunication data networks) for many reasons including because there is not enough computing power or storage in the edge servers.

In response, attempts have been made to keep the most sought-after data on the edge servers. Other less sought-after data is stored on hub systems and in central datacenters based on how frequently the data is being accessed from the edge servers. Conventional arrangements, however, require each edge server to independently decide which data to keep and which data to flush out of the memory or cache of the edge server. This requires each edge server to use significant computing resources to simply manage their cache of data.

For example, end users do not always look or search for the same data and users are constantly looking for new and different data. This forces each edge server to experience a costly (and time-consuming) cache miss process that requires the cache to be regenerated. Hub systems face similar problems. As a result, many of the resources that could be used to improve the end user experience are instead devoted to cache maintenance.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
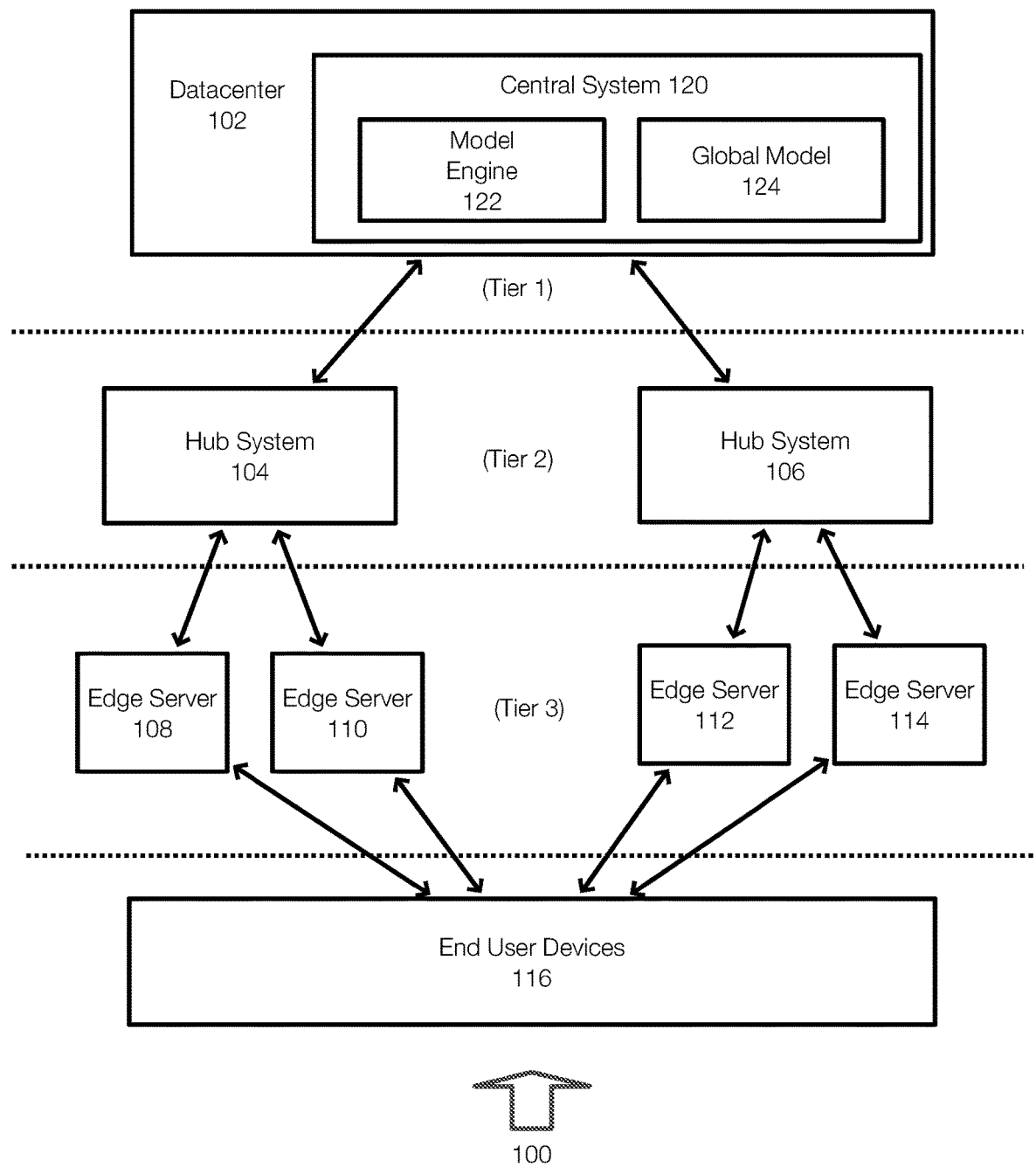
FIG. 1 is an example of a distributed data network in which data tiering is performed.

Embodiments of the present invention generally relate to data tiering and federated machine learning for data tiering. Embodiments of the invention relate further to systems, methods, and apparatus for optimizing data tiering in distributed computing systems and, more specifically, to systems, methods, and apparatus for data tiering in edge computers, hub systems, and central data systems. Examples of optimization methods include, but are not limited to, decentralizing data tiering in distributed environments, sharing learning with other systems or federated learning or federated model training, and/or controlling model development for data tiering including model training and model retraining. More particularly, embodiments of the invention relate to systems, hardware, software, computer-readable media, and methods for performing data tiering operations and data tiering related operations.

Embodiments of the invention are described in the context of a distributed data system wherein users access data or content through edge servers (also referred to herein as edge computers, edge computing systems, edge devices or edge systems). To the extent the requested data is present or stored at the edge servers (e.g., in the cache or another edge-based storage system), the edge servers are able to serve the request directly without having to send the request further into the network. Otherwise, the request may be forwarded up to hub servers and/or to a datacenter. Embodiments of the invention relate to tiering data such that the requested data or the most sought-after data is present at the edge servers. Embodiments of the invention may also be applied to the Internet of Things (IOT) scenarios. Data needed by IOT devices can be pushed to the edge of the data network.

Embodiments of the invention implement federated learning on a set of edge servers and/or hub servers (also referred to as clients in the context of federated learning) in the context of a central system. Thus, the edge servers and hub servers may be referred to as clients of a central system. The central system may include a datacenter or may be implemented in a datacenter and the central system is configured to generate, maintain, update, and distribute a global model for tiering data in the distributed network. Embodiments of the invention also tier the data using the generated model. In addition, embodiments of the invention distribute new data based on the global model with the expectation of anticipating or predicting requests for the data from end user devices. When queries are not satisfied at the edge servers (e.g., cache misses), the model may be retrained.

Federated learning, by way of example only, allows distributed servers such as edge servers or systems to be used in a collaborative manner. In the context of a distributed computing system, learning that occurs at one edge server or edge computing system can be combined with the learning that occurs at other edge servers or edge computing systems.

FIG. 1 illustrates an example environment in which data tiering or data tiering with federated learning may be implemented. More specifically, FIG. 1 illustrates an example of a distributed data network such as a telecommunication distributed data network where data is delivered to end user devices through edge servers or edge computing systems. End user devices 116 interface with edge servers (one or more of edge servers 108, 110, 112 and 114) to access the data network 100. Thus, if the requested data is present in the edge servers, then the data is returned to the end user devices 116 more quickly compared to accessing or requesting the data from the central system 120.

Embodiments of the invention aim to improve the delivery of data by tiering the data such that the most requested or the most sought-after data is stored at the edge servers. Further, the system may be configured to anticipate user requests and push data preemptively to the edge servers. Tiering the data, in one example, refers to storing the data at different locations in the network 100.

FIG. 1 illustrates relationships between a data center 102, hub systems 104 and 106, and edge servers (or edge computing systems) 108, 110, 112 and 114. In this example, the hub systems 104 and 106 may each communicate with the datacenter 102. The edge servers 108 and 110 may communicate with the hub system 104 and the edge servers 112 and 114 may communicate with the hub system 106. Although a single datacenter 102 is illustrated, embodiments of the invention can be extended to multiple data centers, multiple hub systems (or hub servers) and multiple edge servers. The edge servers are typically geographically distributed. These systems, including the edge servers, hub systems, and the datacenter, include the hardware (processors, memory, networking circuits, etc.) to implement a distributed data network.

In this example, the data center 102 may include or be associated with a central system 120. Generally stated, the central system 120 is in the cloud and the datacenter 102 is also part of the cloud. The central system 120 is an example of a system that is configured to perform data tiering operations. Data tiering operations may include determining which data to push to the hub systems 104, 106 and/or the edge servers 108, 110, 112 and 114. More generally, the central system 120 may determine where different data is stored or tiered in the distributed data network 100. Some aspects of the data tiering operations may be performed at clients (e.g., the edge servers 108, 110, 112 and 114 and/or the hub systems 104, 106 are clients of the central system 120). In other words, aspects of the central system 120 may be implemented and execute at the hub systems 104, 106 and/or at the edge servers 108, 110, 112 and 114.

The central system 120 may include a model engine 122 that is configured to manage a global model 124. The central system 120 may manage multiple models. Managing a model may include creating, updating, distributing, training, retraining, validating, or the like. Each model may be adapted for different types of data. Consider the following example that represents a model for video data. This model is used to distribute video data or video-related data in the network 100. A similar process may be performed with respect to other types of data such as sport data, animal data, magazine data, or any other type, categorization, or grouping of data.

A model is typically associated with features identified by a feature set, which may be different in different models. For a model on video data, an example feature set (by way of example and not limitation), may include a video release date, a tag for the video, social media trends for tags in the video file, geographical location of upload, categorical data for content of the video (language, genre), tags, comments on the video, links to video data, and the like or combination thereof. The global model may also be associated with parameters and hyperparameters.

In this example, the model engine 122 is configured to initialize a global model 124. Once completed, the global model 124 is configured to predict the data that will be accessed or requested by the end user devices 130 (or end users). The global model 124 may predict the data that will be accessed at a predetermined interval. In other words, the global model 124 may be valid for the next 24 hours or other time period (day, week, etc.). In addition, the global model 124 may be used to predict a relative priority of existing data or storage blocks.

In one example, the model engine 122 will initialize the global model 124 to learn the behavior of end users on accessing data to predict the data that will be accessed in the next time period or in the next stipulated time. Stated differently, the global model 124 may use a corpus of user requests or accesses to learn how end users request or access data. Initializing the global model 124 may include identifying parameters and/or hyperparameters, selecting features for the feature set, or the like. In one example, after the global model 124 is initiated or ready to be trained, the global model 124 is pushed or transmitted to selected edge servers or selected clients (e.g., subset of the edge servers).

For example, the model engine 122 may push the global model 124 to the edge server 108 and the edge server 112. Typically, the selected subset of edge servers includes edge servers from multiple geographic locations.

The selected edge servers use their own local data to train the global model 124. For example, data requests from users (which may be stored at the edge servers) and other information such as geographic location, time of day, and the like are examples of data that may be used by the edge servers 108 and 112 to locally train the global model 124 received from the central system 120 at the datacenter 102.

Because the global model 124 is being trained at different edge servers using data that is local to those edge servers, the training will differ. In this example, the training at the edge server 108 will likely differ from the training at the edge server 112. As a result, the edge servers 108, 112 that are training the global model 124 will periodically send updates back the central system 120 or to the model engine 122 and these updates may also be different.

The model engine 122 may receive all of the updates from all of the edge servers that are involved in training the global model 124. These updates can be incorporated (e.g., by averaging the updates) and updating the global model 124 with the average. The global model 124 (now updated) is then sent to the edge servers 108 and 112 again for further training. This process can be repeated (e.g., several times a day or according to another schedule) until, in one example, the updates are less than a threshold value or the averaged update is less than a threshold value. This allows the learning and training to be federated at least in the sense that the global model 124 can account for learning that occurred at multiple geographically dispersed edge servers.

Once the global model 124 is sufficiently trained (e.g., when updates are or the average update is de minimis or below a threshold value), the global model 124 can be used for data tiering operations. At this stage, the global model 124 may be distributed to all of the edge servers. The edge servers that were not involved in the training may be used for validation purposes in one example. The global model 124, for example, can be validated using the local data of the edge servers that were not involved in training. In this example, the global model 124 may be validated on the local data of the edge servers 110 and 114.

The global model 124 determines how data, or more specifically which data, is stored at the edge servers 108, 110, 112 and 114 (tier 3), what data is stored at the hub systems 104 and 106 (tier 2) and what data is stored at the datacenter 102 (tier 1). The data center may have a copy of all data in one example.

More specifically, the global model 124 can be used to identify the data to be pushed to the edge servers 108, 110, 112 and 114 and/or to the hub systems 104 and 106. The global model 124 can also be used to manage the caches of the edge servers and the hub systems. Data in the caches is replaced based on outputs of the model.

This allows the most sought-after data to be moved to tier 3 or to the edge servers while the least sought-after data is retained or kept at the datacenter 102—not pushed to the edge servers. Data that is in the middle (e.g., not the most sought-after and not the least sought-after) may be stored at or pushed to the hub systems. This allows the central system 120 (the data tiering system) to place data in the various tiers such that the data can be accessed quickly. As the most sought-after data is moved closer to the end user devices 116, the data can be retrieved more quickly and latency associated with user queries is reduced. This improves performance of the system, particularly from the perspective of the end users because the end user devices 116 are closer to where the data is stored from a network perspective.

For example, the global model 124 may be used to parse or process data stored at the datacenter 102 to prioritize the data and identify data to be pushed. In other words, the global model 124 may identify data at the datacenter 102 that should be pushed to the edge servers or to selected edge servers. Because the global model 124 can account for geography, the global model 124 may identify different data for different edge servers. The global model 124 may also identify data that should be stored at the hub systems 104 and 106. In one example, a model specifically for the hub systems could also be implemented in a similar manner.

As a result, for data at the datacenter 102, the global model identifies the data to be pushed to the edge servers or to the hub systems. As previously stated, because the global model 124 is trained on the local data of the edge servers and relates to the behavior of end users with respect to accessing data, the data pushed to the edge servers is the data most likely to be accessed by the end user devices 116. As new content or data is added to the datacenter 102, the data can be prioritized using the global model 124 and pushed out to the edge servers if indicated.

The global model 124 can also be used at the edge servers to clean or remove data that may no longer be accessed as frequently by the end user devices 116. More specifically, the global model 124 allows the data at the edge servers to be parsed to determine how the local data should be handled. For example, the global model 124 may be used to determine whether certain data should be kept locally in a cache. Data stored in the cache of the edge server 108, for example, may be ranked or prioritized by the global model 124. This ranking is not necessarily a serialized ranking where data is simply put in a list, but instead represents the probability that the data will appear in a user's request. In other words, the ranking or prioritization is intended to identity the data that is the most sought-after data. In the context of a certain video, the ranking may represent the probability of whether that certain video will be requested by an end user.

In the context of cleaning the cache of the edge server 108, new video content may be ranked higher than the lowest ranked video content. In this example, the new video may replace the lowest ranked video in the cache of the edge server. Thus, the global model 124 attempts to predict which video content (or other data) will be requested and allows the edge server to store that data locally in the cache of the edge server. This approach is distinct from generating a cache based on cache miss rates or cache misses. Rather, the predictive ability of the global model allows the cache to be populated with data or content for which requests are expected or anticipated.

Thus, the global model 124 allows the data to be tiered within the distributed data network 100 by processing the local data of the edge servers 108, 110, 112, and 114 and by processing the data of the datacenter 102 or received into the datacenter 102.

Over time or after a predetermined period, there may be a need to update the global model and/or retrain the global model. Retraining may be needed because user requests will change over time and the model may lose some of its ability to predict the user's requests. In one example, the need to retrain can be associated with cache miss rates. When cache miss rates exceed a threshold, the global model 124 may be retrained. A high cache miss rate indicates that the global model 124 is not adequately predicting the user's requests. The decision to retrain and the associated threshold is distinct from the threshold used in updating the model during retraining. During retraining, the edge servers 108, and 112 (the selected subset of edge servers used to train the global model or retrain the global model) may send updates to the central system 120. When the average update no longer exceeds a threshold value, the global model 124 is deemed retrained and may be distributed to all of the edge servers.

In one example, the global model 124 is trained using the requests of end users and other information such as geographic location, time of day, or the like. The global model 124 is trained using computational power of the edge server. In this process, the hyper parameters are tuned locally at each edge server and the updates are sent to the central system 120. Instead of sending the complete updated model, an optimized update such as a sketched update of the model can be sent to the central system to reduce network traffic.

Figure 2:
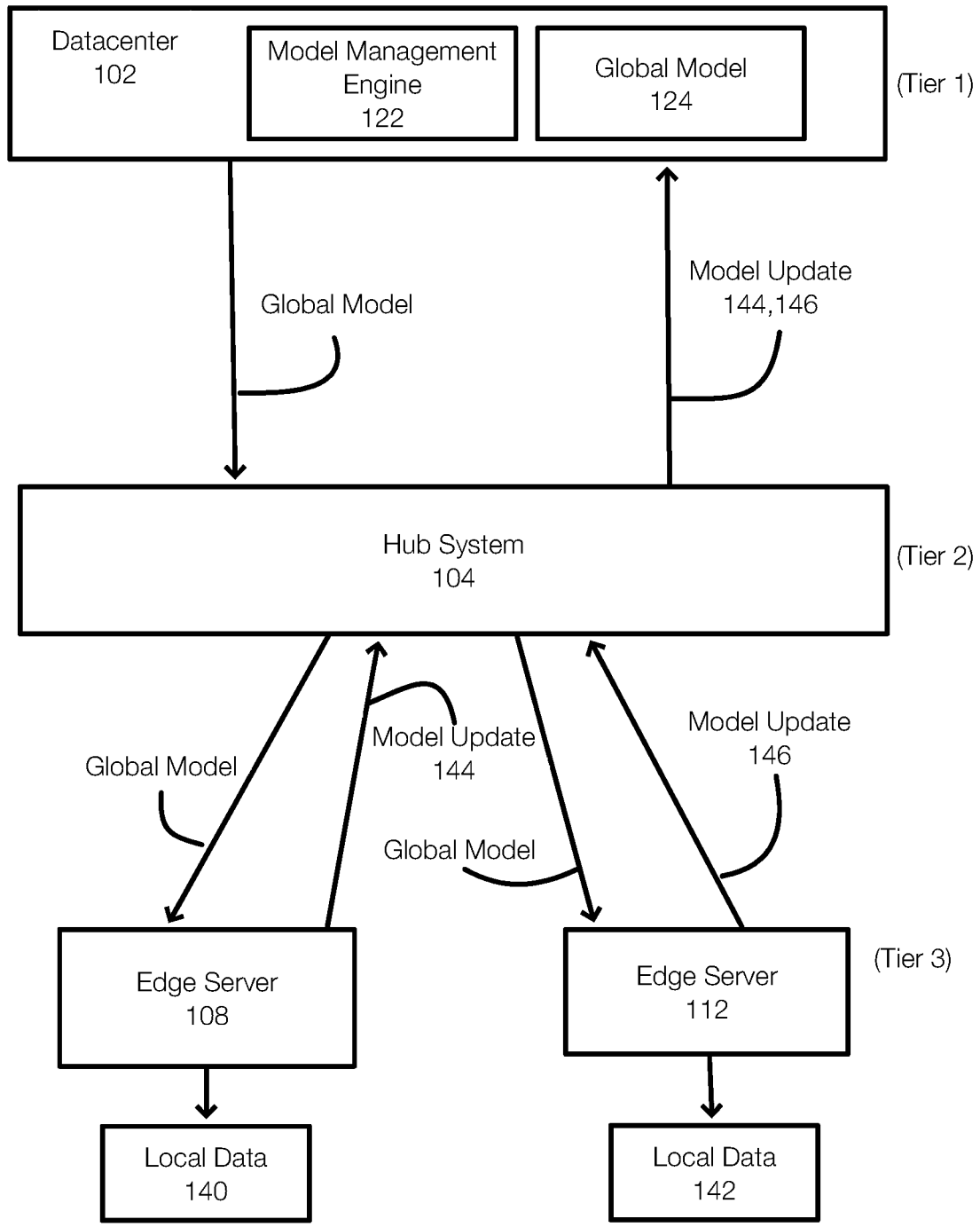
FIG. 2 illustrates an example of a distributed data network and illustrates an example of using local data in a federated manner to train a global model.

FIG. 2 illustrates a flow of the global model in the distributed data network. FIG. 2 illustrates that the global model 124 is passed to the hub system 104 and pushed to the edge server 108. The global model is then trained on the local data 140 of the edge server 108 and a model update 144 is returned to the model engine 122 through the hub system 104.

Similarly, the model is pushed to the edge server 110 through the hub system 104 and the global model 124 is also trained on the local data 142 of the edge server 142. A model update 146 from the edge server 110 is returned to the model engine 122 through the hub system 104.

Because the global model 124 was trained on different edge servers independently of each other, the updates are likely to be different at least because the local data 140 is different from the local data 142.

the model engine 122 may average the model updates 144 and 146 (and other updates received from other edge servers) and update the global model 124. At this stage, the process is repeated and the global model 124 (now updated) or portion thereof is delivered to the selected edge servers for further training. This process is repeated until the updates are less than a threshold. In one example, the edge servers used to initially train the global model may differ from the edge servers used to retrain the model. The edge servers used to validate the model may also be changed.

Figure 3:
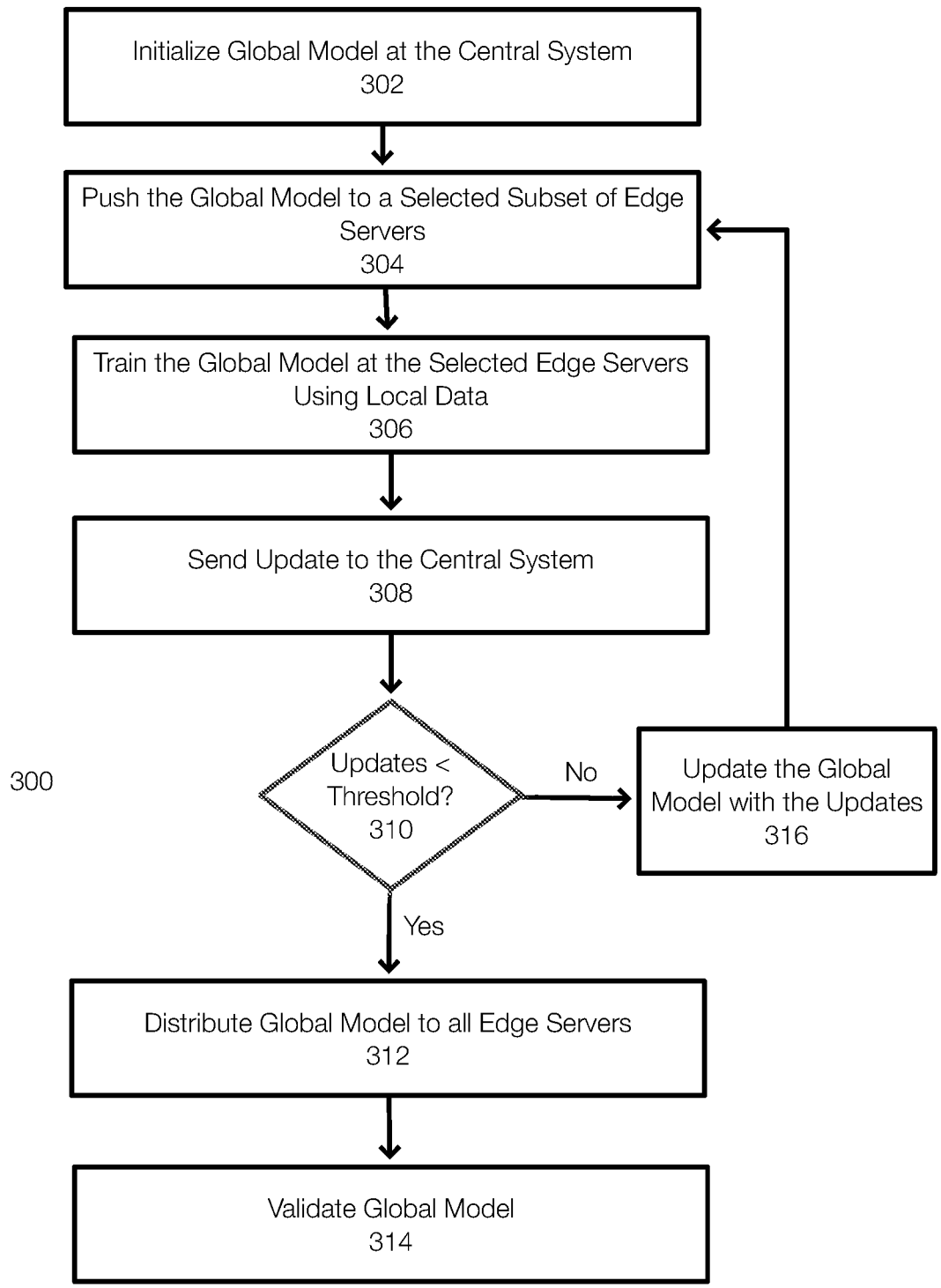
FIG. 3 is an example of a method for training a global model that can be used in a distributed data network.

FIG. 3 illustrates an example of a method 200 for optimizing data tiering using federated machine learning in a distributed data network. The method 300 may be performed for a plurality of models. The method 300 may begin when a global model is initiated 302 at a central system. This may include defining feature sets, selecting and/or setting parameters, hyperparameters, or the like. In one example, the global model Is configured to predict the data that is going to be accessed by end users in a stipulated time and/or to predict a relative priority of all storage blocks. The global model is configured to learn end users' behavior on accessing data (learn what data is accessed or requested by the end users) in order to predict which data will be accessed in the next stipulated time.

Once the global model is initiated, the global model is pushed 304 or distributed to a selected subset of edge servers (and/or hub servers or systems). As a result, the global model is received by a plurality of independent edge servers that interact, typically, with different end user devices and in different conditions.

The global model is then trained 306 at selected edge servers using the local data of the edge servers. The edge servers can be selected purposefully or randomly. In a telecommunication data network, the edge servers may reside in towers for example and are closest to the end user devices. Thus, each of the edge servers is able to train the global model separately and independently of other edge servers. Part of training may include tuning the hyperparameters of the global model.

One advantage is that each edge server can contribute to the development of the global model independently. In effect, each of the edge servers can benefit from the learning that occurs at the other edge servers. This allows an edge server to generate a cache that is based on the learning acquired from other edge servers.

After some period of time, an update is sent 308 to the central system (or central server). The update may include potential changes to the model such as changes to parameters, hyperparameters, weights, or the like. Thus, the central system receives an update from each of the edge servers that is training the global model. Often, an optimized update such as a sketched update of the model is sent to reduce network traffic. Further, the local training and update can be performed when the system load is low. Generally, user information is protected. The updates may not include information that could be used to regenerate sensitive user information.

Next, the central system may process the updates. In one example, the central system may average the updates received from the edge servers. If the average of one or more of the parameters of the update (or other number or weight) is less than a threshold 310, then the global model is ready for use in the system and the global model can be distributed 312 to all edge servers. If the average is higher than the threshold 310, then the global model is updated 316 with the updates or with the average and the process returns to 304 where part of the method is repeated.

Once the global model has been distributed, the global model 314 can be validated 314. The global model may be validated based on the local data of edge servers that were not involved in training the global model. In another example, the global model may be trained on any number of edge servers. The global model may be trained using all or less than all of the edge servers.

The learning system may be configured as follows at the edge servers using the following points:

1. A subset Φ of available clients (edge servers) are selected for local training.
2. The central system pushes the global model n number of times in a day to this subset Φ.
3. This subset of clients Φ trains the global model locally using their local data.
4. The global model is initialized with W weights, by the central system.
5. This $W_t$ is the weight matrix for the global model at a learning cycle of 't'.
6. This weight matrix is sent to the client systems and after the local Stochastic Gradient Descent learning at the client system, the update is calculated as: $u_i=\hat{W}t-W_t$ (where 'i' denotes the client number).
7. This update $u_i$, is sent to the central server for updating the global model.
8. The average update for the '$t^{th}$' learning cycle is computed in central system as follows:

$$U_t = \frac{1}{n}\sum_{i=0}^{n} ui$$

9. The global model is then updated with the average update with a learning rate of 'η' as: $W_{t+1}=W_t+\eta U_t$ This learning or update process is repeated until the updates or the average of the updates is less than a threshold from the previous version of the global model. Once the model is completed or updated and ready for deployment, the global model has several purposes. The global model is optimized for tiering of storage blocks or tiering of data in the server network. In one example, the data present in the datacenter is parsed with the final global model to prioritize data for different edge servers and hub servers depending on their features like geographic location, relevance, or the like. The global model may be distributed to hub servers and edge servers at different geographical locations and data residing at these servers may parsed using the current global model to determine the relative priority of all data or of all data storage blocks. Data may be cleaned (e.g., evicted from a cache or moved to a different tier) if the relative priority is less than some threshold value. Alternatively, data is selectively replaced based on the output of the global model, which may be a probability. For example, new data may simply replace the data that has the lowest priority or probability of appearing in a user request. Thus, the global model allows data to be moved into and/or out of the edge servers. The global model improves the likelihood that the most sought-after data will be stored in the edge servers.

When the global model is used, by way of example only, for video data, a body of user requests may be used to identify and/or evaluate the video data which have been requested for a predetermined learning time interval mentioned in point 2 above (see ¶45). Using these requests (along with other information such as time and location), the global model is tuned to in accordance in the user's requests. This can then be used to determine what data should be cached at the edge servers or not cached at the edge servers. For example, a user request for a drama starring a particular actor can be used to train the model. It may be the case that multiple requests for the same data are made. The updates to the model include changes that allow the model to identify data relevant to this request to be identified and pushed to the edge servers.

For example, a search for videos in the drama genre may invoke an application to request to a host such as an edge server form information (e.g., metadata) for videos that have the tag "drama". The metadata may also include additional information such as poster image, cast, release year, run time, a link to the video, or the like. The end user may select (another type of request from an end user) a video from the list of videos. This selection can then be used in tuning/training the model to identify the most-requested video data. As a result, this will, ultimately, be the data pushed to the edge server.

As previously stated, when new trends for fetching or accessing data are developed by end users, each edge server conventionally experiences a performance decline because each edge server typically goes through a costly cache miss algorithm.

Embodiments of the invention allow caches to contain data based on federated learning. In addition, embodiments of the invention allow can use the global model to distribute new data to the edge servers such that cache miss rates are reduced at edge servers.

For example, when new data is added to the datacenter 102, the data would be conventionally requested by the edge servers. However, the global model ensures that the new data is pushed upfront to the edge servers before there are queries from end users for the newly added data as long as the new data, in one example, comports with the global model. In this manner, central system is able to anticipate and avoid cache misses at the edge servers. This is achieved by parsing the newly added data with the current global model and, based on the features of the newly added data, pushing the newly added data to at least some of the edge servers. In one example, this may prevent the edge servers from having to rebuild their caches because the requested data, which would conventionally result in a cache miss, has been preemptively pushed to the edge servers and added to their respective caches where appropriate.

Figure 4:
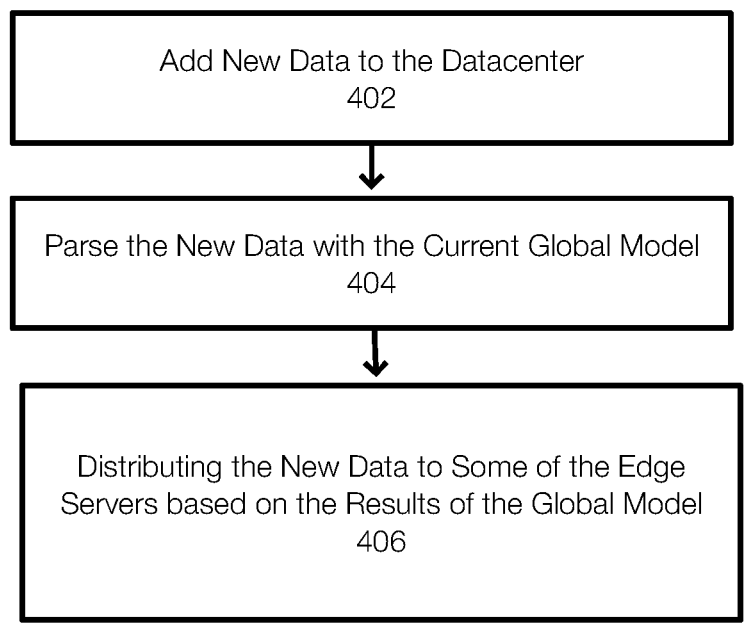
FIG. 4 is an example of a method for proactively pushing new content to edge servers using a global model that is trained in a federated manner.

FIG. 4 illustrates an example of distributing new content to the edge servers. In FIG. 4, new data may be added 402 to the datacenter. The new data is then parsed 404 with the current global model. By parsing the new data, a priority or probability of the new data can be determined. The probability relates to how likely it is that a user will request the new data. For example, the global model may determine that the new data will be sought-after for users associated with a first edge server but will not be sought-after with respect to a second edge server. Thus, the new data is pushed or distributed 406 to at least some of the edge servers based on the results of the global model. Alternatively, the data bay be distributed based on features of the new data.

There may be times when it is necessary to retrain the global model. For example, when a request for data is received that results in a cache miss, the request may be forwarded to the hub systems for the requested data. The request may not have been made previously by any end user.

When the number of missed requests increases above a threshold value, the global model may be retrained as previously described at least because the high cache miss rate indicates that the global model is not anticipating the user requests in a satisfactory manner. Thus, rather than simply regenerating the cache at each edge server independently, the retrained model will benefit from federated machine learning and the central system will push data to the edge servers using the retrained model. Plus, as previously described, new content is also pushed proactively to the edge servers based on an output of the global model or retrained global model. As the global model is retrained, another threshold is used when updating the global model. When the updates to the global model are less than a threshold value, the global model is considered completed and ready for deployment to the edge servers.

The central system enables a decentralized method for tiering data in a distributed environment. The learning acquired in the system can be shared with all systems in the network and the same model can be shared by all contributing systems in the network. The global model, which benefits from federated learning, can anticipate and avoid cache misses by proactively pushing new content from a central datacenter to the edge serves. Content in the caches of the edge servers whose probability is lowest or that are ranked lowest by the model may be replace with new content from the central system. Further model development and training (including retraining) can be controlled from a remote central location for all edge systems in the environment. Also, the method ensures that sensitive user information is not transferred over the network.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations or data tiering operation. Such data management operations may include, but are not limited to, data tiering operations, data distribution operations, proactive data pushing operations, predictive user behavior operations, or the like. More generally then, the scope of the invention embraces any operating environment in which the disclosed concepts may be useful. By way of illustration, but not limitation, embodiments of the invention may be employed in connection with data networks including distributed data networks including edge computing systems and telecommunications data networks.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for tiering data in a distributed data network, the method comprising:
   (a) pushing a global model from a central system to each of selected edge servers in the distributed data network, wherein the selected edge servers are a subset of edge servers operating in the distributed data network;
   (b) training the global model at each of the selected edge servers, wherein each of the selected edge servers uses their own local data to train the global model;
   (c) receiving updates to the global model from the selected edge servers at the global model at the central system;
   (d) updating the global model at the central system based on the updates;
   (e) identifying data, by the global model, to distribute to the edge servers;
   (f) distributing the data from a datacenter to the edge servers, the data including first data and second data, wherein the first data is at least partially different from the second data, wherein the first data is delivered to a first edge server included in the edge servers and the second data is delivered to a second edge server included in the edge servers;
   (g) retraining the global model when a request miss rate exceeds a threshold rate; and
   (h) avoiding cache misses by pushing new data received at the datacenter to the edge using the global model.

2. The method of claim 1, wherein updating the global model includes averaging the updates and applying the average update to the global model.

3. The method of claim 1, further comprising repeating steps (a)-(d) until the updates are less than a threshold.

4. The method of claim 1, further comprising distributing the global model to the edge servers.

5. The method of claim 4, further comprising validating the global model by each of the edge servers not included in the selected edge servers using corresponding local data.

6. The method of claim 4, wherein the updated global model allows each of the edge servers to benefit from learning of the selected edge servers.

7. The method of claim 1, wherein distributing the data includes tiering data in the distributed data network.

8. The method of claim 7, further comprising applying the global model to data at a datacenter and pushing data to at least some of the edge servers using the global model.

9. The method of claim 7, further comprising applying the global model to data at the edge servers and cleaning data from the edge servers that does not meet a threshold.

10. The method of claim 1, further comprising retraining the global model when a request miss rate exceeds a threshold rate.

11. The method of claim 1, further comprising avoiding the cache misses by pushing the new data received at the datacenter to the edge servers before receiving requests for the new data using the global model.

12. The method of claim 1, further comprising initiating the global model, wherein the global model is configured to predict data that end users are expected to access in a stipulated time.

13. A non-transitory computer readable medium comprising computer executable instructions that, when executed by a processor and memory, perform a method for tiering data in a distributed data network, the method comprising:

initiating, at a datacenter, a global model for tiering data in a distributed data network that includes the datacenter, hub servers, and edge servers;

repeating until updates to a global model are less than a threshold:

pushing the global model from a central system associated with the datacenter to each of selected edge servers in the distributed data network, wherein the selected edge servers are a subset of edge servers operating in the distributed data network and wherein the edge servers are closest to end user devices;

training the global model at each of the selected edge servers, wherein each of the selected edge servers uses their own local data to train the global model;

sending updates to the global model at the central system from the selected edge servers to the central system; and updating the global model by the central system based on the updates;

identifying data, by the global model, to distribute to the edge servers;

distributing the data from a datacenter to the edge servers, the data including first data and second data, wherein the first data is at least partially different from the second data, wherein the first data is delivered to a first edge server included in the edge servers and the second data is delivered to a second edge server included in the edge servers;

retraining the global model when a request miss rate exceeds a threshold rate; and avoiding cache misses by pushing new data received at the datacenter to the edge servers using the global model.

14. The non-transitory computer readable medium of claim 13, wherein updating the global model includes averaging the updates received from the selected edge servers and applying the average update to the global model at the central system.

15. The non-transitory computer readable medium of claim 13, further comprising distributing the global model to the edge servers once the updates are less than the threshold.

16. The non-transitory computer readable medium of claim 15, further comprising validating the global model by each of the edge servers not included in the selected edge servers using corresponding local data.

17. The non-transitory computer readable medium of claim 13, wherein the updated global model allows each of the edge servers to benefit from learning of the first edge servers.

18. The non-transitory computer readable medium of claim 13, further comprising tiering data in the distributed data network.

19. The non-transitory computer readable medium of claim 13, further comprising:

applying the global model to data at a datacenter and pushing data that meets a threshold to at least some of the edge servers; and applying the global model to data at the edge servers and cleaning data from the edge servers that does not meet a threshold.

20. The method of claim 1, further comprising:

avoiding the cache misses by pushing the new data received at the datacenter to the edge servers in anticipation of requests for the new data using the global model.

* * * * *